(12) United States Patent
Calloway et al.

(10) Patent No.: US 8,434,832 B2
(45) Date of Patent: May 7, 2013

(54) METHOD AND APPARATUS FOR LOCKING A COMPUTER DEVICE

(75) Inventors: John E. Calloway, Houston, TX (US);
Juan M. Perez, Tomball, TX (US);
Donald J. Hall, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2507 days.

(21) Appl. No.: 11/077,072

(22) Filed: Mar. 10, 2005

(65) Prior Publication Data
US 2006/0203434 A1 Sep. 14, 2006

(51) Int. Cl.
*A47B 81/00* (2006.01)

(52) U.S. Cl.
USPC .................................................. 312/223.2

(58) Field of Classification Search .................. 312/222, 312/223.1, 223.2, 333; 361/683–686, 724–727; 439/152, 155, 157, 159, 483, 484; 248/220.31, 248/224.8, 500, 581
See application file for complete search history.

(56) References Cited

U.S. PATENT DOCUMENTS

| | | | | |
|---|---|---|---|---|
| 2,036,154 | A | * | 3/1936 | Littledale ....................... 292/170 |
| 2,247,937 | A | * | 7/1941 | Bittorf et al. ................... 292/174 |
| 4,688,131 | A | | 8/1987 | Noda et al. |
| 5,168,427 | A | | 12/1992 | Clancy et al. |
| 5,435,737 | A | | 7/1995 | Haga et al. |
| 5,446,618 | A | * | 8/1995 | Tetsuya et al. ................. 361/683 |
| 5,465,191 | A | * | 11/1995 | Nomura et al. ................ 361/681 |
| 5,557,562 | A | | 9/1996 | Yoshiharu et al. |
| 5,626,374 | A | * | 5/1997 | Kim .............................. 292/170 |
| 5,660,553 | A | | 8/1997 | Larabell |
| 5,734,548 | A | | 3/1998 | Park |
| 5,768,100 | A | | 6/1998 | Barrus et al. |
| 5,786,984 | A | | 7/1998 | Bonardi et al. |
| 5,787,737 | A | | 8/1998 | Cho |
| 5,820,235 | A | | 10/1998 | Tsai |
| 5,825,616 | A | | 10/1998 | Howell et al. |
| 5,854,736 | A | | 12/1998 | Fuhs et al. |
| 5,921,697 | A | | 7/1999 | Karl et al. |
| 5,936,798 | A | | 8/1999 | Johnson et al. |
| 6,058,016 | A | | 5/2000 | Anderson et al. |
| 6,109,710 | A | | 8/2000 | Wu et al. |
| 6,128,185 | A | | 10/2000 | Fuhs et al. |
| 6,193,339 | B1 | | 2/2001 | Behl et al. |
| 6,195,259 | B1 | | 2/2001 | Whitman et al. |
| 6,209,719 | B1 | | 4/2001 | Klijsen et al. |
| 6,246,575 | B1 | | 6/2001 | Barrus et al. |
| 6,272,010 | B1 | | 8/2001 | Schmitt |
| 6,332,658 | B1 | | 12/2001 | Sato et al. |
| 6,407,910 | B1 | | 6/2002 | Diaz et al. |
| 6,407,914 | B1 | | 6/2002 | Helot |
| 6,442,984 | B1 | | 9/2002 | Katoh et al. |
| 6,457,788 | B1 | * | 10/2002 | Perez et al. ................. 312/265.5 |
| 6,462,940 | B1 | | 10/2002 | Diaz et al. |
| 6,466,433 | B1 | | 10/2002 | Diaz et al. |

(Continued)

*Primary Examiner* — Janet M Wilkens
*Assistant Examiner* — Timothy M Ayres

(57) ABSTRACT

A lock for a computer device comprises a lever operable to be positioned in a locked position and comprising at least one flange, a locking base slidably coupled to a device housing and attached to the lever, and a spring coupled to the locking base and to the device housing and operated upon by the lever, where in the locked position the at least one flange slides in a first corresponding at least one notch formed on the device housing, and where the locking base slides into a corresponding second notch formed on the device housing.

8 Claims, 3 Drawing Sheets

U.S. PATENT DOCUMENTS

| | | |
|---|---|---|
| 6,493,222 B2 | 12/2002 | DiFonzo et al. |
| 6,522,547 B1 | 2/2003 | Diaz et al. |
| 6,565,163 B2 | 5/2003 | Behl et al. |
| 6,570,757 B2 | 5/2003 | DiFonzo et al. |
| 6,683,785 B1 | 1/2004 | Chen |
| 6,715,850 B1 | 4/2004 | Diaz et al. |
| 6,801,434 B2 | 10/2004 | Gallarelli et al. |
| 6,980,429 B2 * | 12/2005 | Ericks n et al. ............... 361/685 |
| 2004/0251799 A1 * | 12/2004 | Goodman et al. .......... 312/223.2 |
| 2005/0023023 A1 * | 2/2005 | Fan et al. ..................... 174/66 |
| 2006/0103272 A1 * | 5/2006 | Chen et al. ................. 312/223.2 |
| 2006/0187632 A1 * | 8/2006 | Chen et al. ................... 361/685 |
| 2007/0222347 A1 * | 9/2007 | Chen et al. ................. 312/223.2 |
| 2007/0247035 A1 * | 10/2007 | Chen et al. ................. 312/223.2 |

* cited by examiner

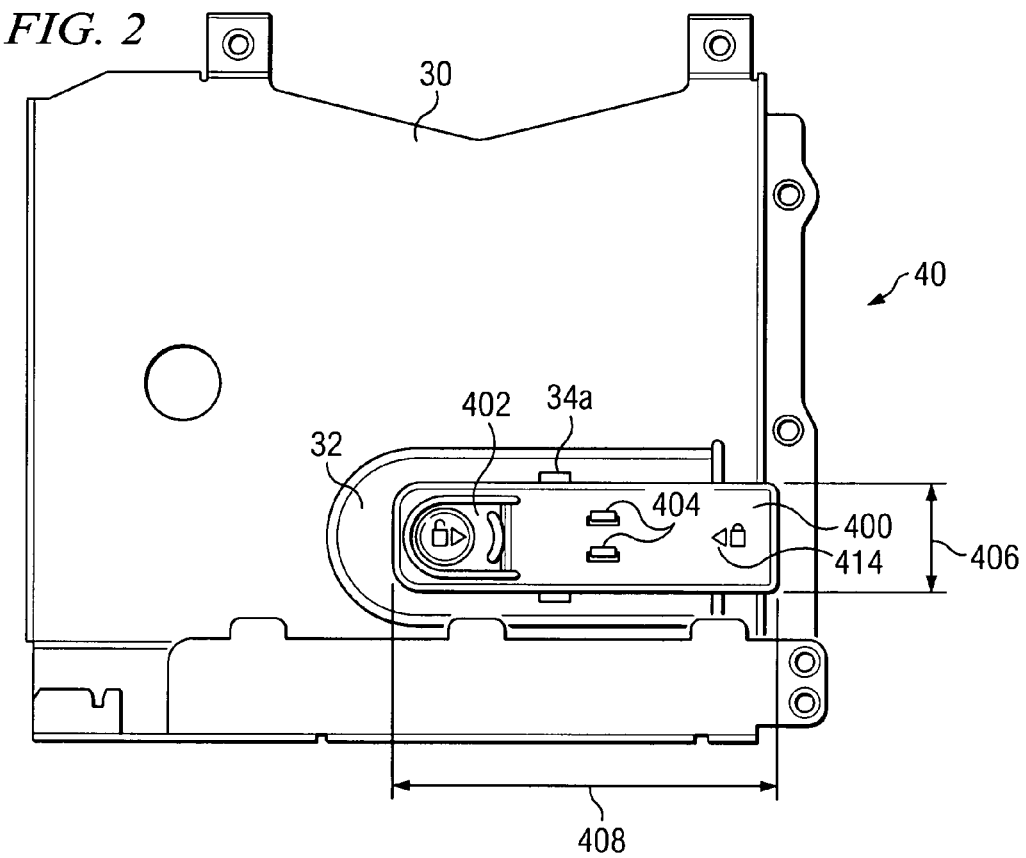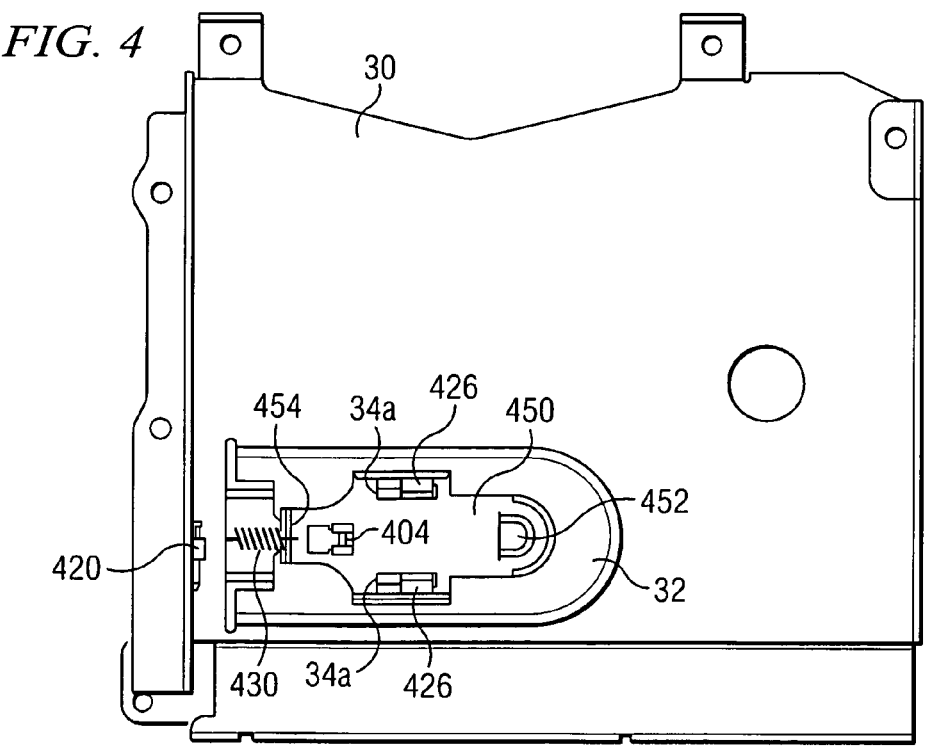

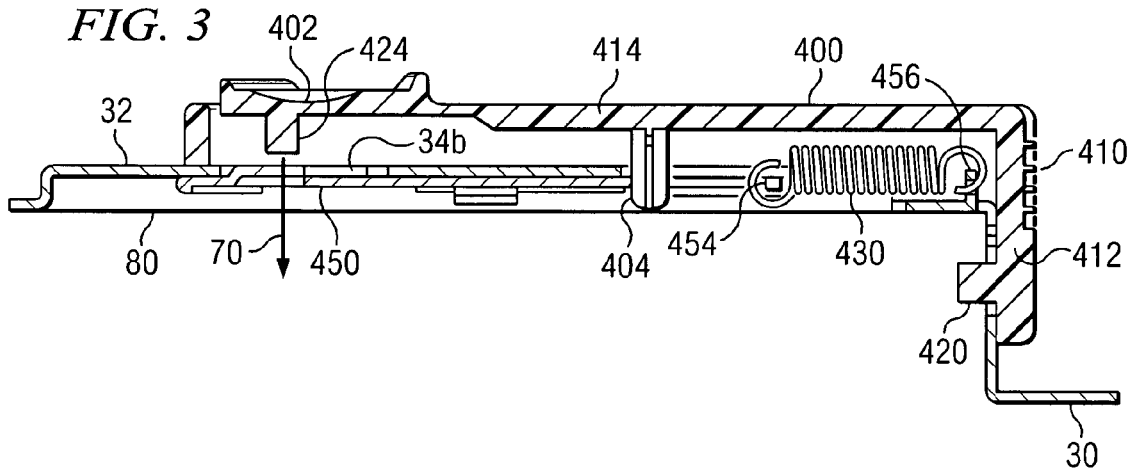
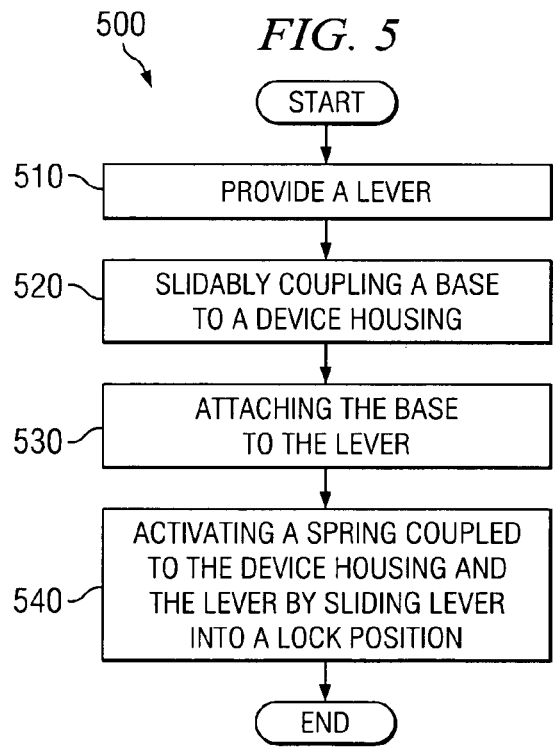

METHOD AND APPARATUS FOR LOCKING A COMPUTER DEVICE

BACKGROUND

A computer chassis is typically equipped with at least one device bay that accommodates one or more computer devices, such as a floppy disk drive, a hard drive, a compact disk drive (CD drive), or any other suitable device or drive. In desktop computer configurations, a computer chassis is equipped with one bay that accommodates one of such computer devices or drives. Consequently, in a desktop computer configuration, especially in a compact desktop design, the bay is configured as a standard housing that accommodates more than one type of device or drive, but can operate one of those devices or drives at a time. Such device bay is often referred to as a "multibay."

A multibay allows the user of a computer to exchange the drive according to a particular need. For example, the multibay may first house a floppy disk drive and then the user changes the drive in the multibay to a CD drive when desired. Providing multibay versatility, however, tends to decrease the security of the drives. That is, the accessibility and removability of the drive also makes it easier for the drive installed in the multibay to be removed without authorization and/or stolen. At least for this reason, securing or locking drives or devices is of concern. Techniques for securing and/or locking drives have typically involved using screws and sliding levers that are operated from the outside of the computer chassis.

In the situation where a screw is used, the screw is installed on the outside of the computer chassis so as to attach the drive or device to the housing or front panel, thereby locking the device to the housing. To increase security, the head of the screw may have a particular hex configuration compatible with a correspondingly configured special tool or hex wrench. However, the use of this special tool may be bypassed by using pliers or other similar tools. Therefore, the use of a screw, while inexpensive to implement is not a very effective security mechanism and thus may actually prove more costly when factoring in the cost of replacement of a stolen multibay device. Similarly, a sliding lever that locks the drive is typically placed on the outside of the chassis, such as at the front panel of the computer, where the sliding lever is accessible and is put in an unlocked position without the use of special tools. However, while the sliding lever seems to be a more accessible tool, operating such a lever has proven difficult. The difficulty arises because the sliding lever generally requires that the sliding action be precise in order to be effective. Additionally, the location of the sliding lever being outside of the computer chassis does not provide more security than the locking screw just described. Consequently, traditional techniques for locking multibay devices are unsatisfactory in certain situations.

BRIEF DESCRIPTION OF THE DRAWINGS

FIG. 2 is a top view of the locking apparatus described in FIG. 1;

FIG. 3 is a cross-sectional view of an exemplary locking apparatus 40 of FIG. 2;

FIG. 4 is a bottom view of the exemplary locking apparatus described in FIG. 2; and FIG. 5 is a method of locking a computer device using the exemplary locking apparatus described in FIG. 2.

DETAILED DESCRIPTION

Figure 1:
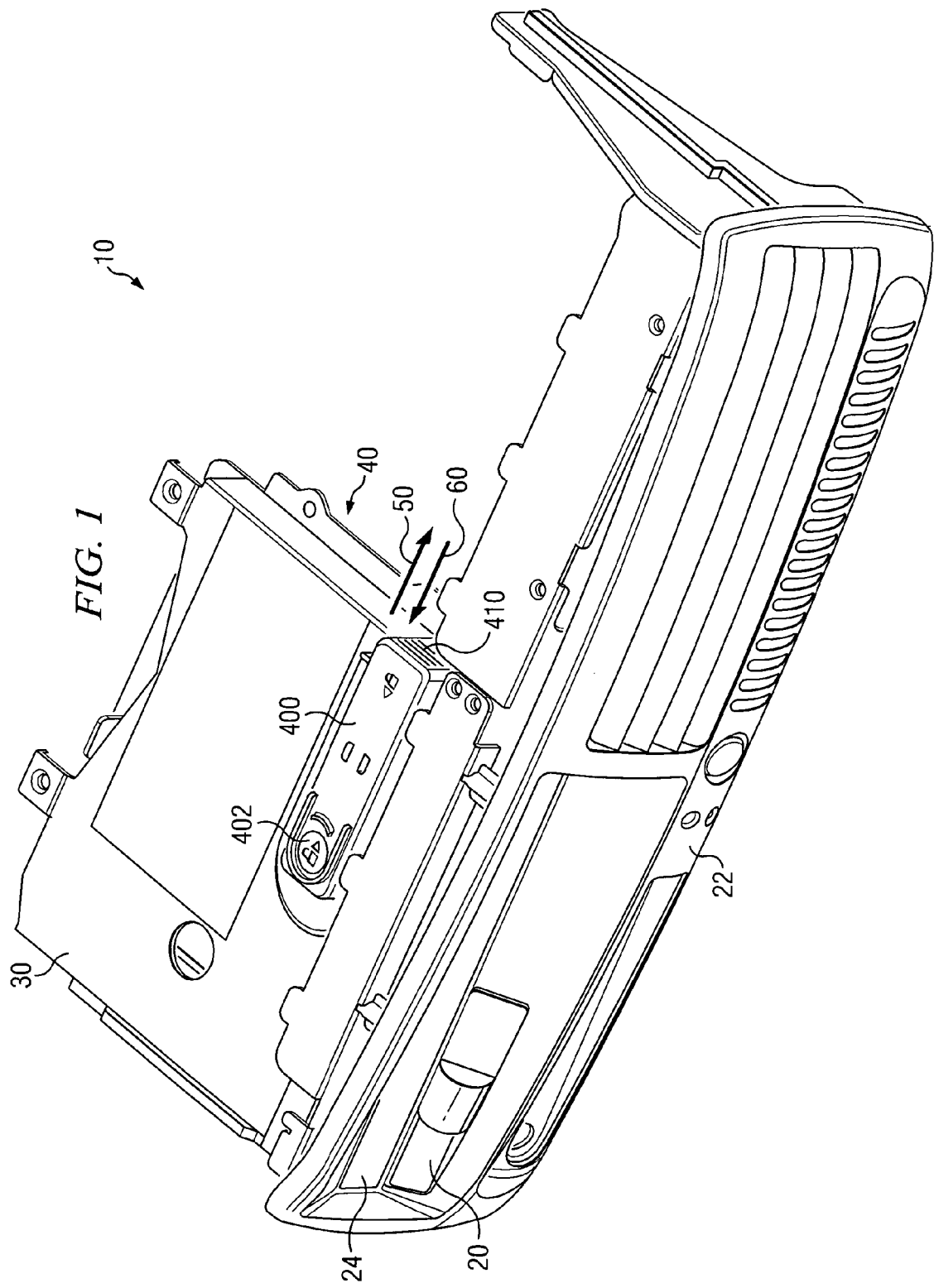
FIG. 1 is a diagram illustrating an embodiment of a computer chassis that incorporates a locking apparatus.

FIG. 1 is a diagram that illustrates an exemplary embodiment of a computer chassis 10 that incorporates a locking apparatus 40. A computer chassis 10 generally houses computer components such as a motherboard, one or more drives, power supply, and various other components that together form a computer environment. In the illustrated embodiment, computer chassis 10 is shown with the cover removed, such that the internal components of the computer can be viewed and accessed. In one embodiment, computer chassis 10 comprises a sliding lever 20 installed on a front panel 22, a device housing 30 for housing a drive 24, and a locking apparatus 40 coupled as shown in FIG. 1. Typically, computer chassis 10 is equipped with at least one device housing 30 that accommodates one of a variety of suitable drives. For example, device housing 30 may accommodate a floppy disk drive, a hard drive, a compact disk drive (CD drive), or any other suitable drive. In the illustrated embodiment, device housing 30 is a multibay housing. According to the illustrated embodiment, computer chassis 10 comprises one device housing 30. However, in other embodiments any number of such housings may be implemented, any or all of which may include a locking apparatus 40. It is intended, however, that locking apparatus 40 be located in any suitable location within a computer chassis 10, such that a device housing 30 can be viewed and accessed by first removing the cover of computer chassis 10.

Sliding lever 20 allows for the removal of a drive 24 from the computer chassis 10. A person may remove drive 24 by activating sliding lever 20 to the unlock position. The use of this lever facilitates the removal of drive 24, however, as explained previously, this solution used alone may pose security risks. Locking apparatus 40 installed on device housing 30 provides for a more secure computer environment. For example, locking apparatus 40 is installed inside computer chassis 10, which results in having to access the inside of the computer chassis 10 in order to remove a drive 24. In certain embodiments, drive 24 is a multibay drive, while in other embodiments it is not. The added complexity of removing drive 24 from the computer chassis 10 has the advantage of reducing the probability of theft of drive 24, which in turn reduces costs to the user.

Locking apparatus 40 is installed on device housing 30 in order to lock a drive 24. Locking apparatus 40 is positioned in the unlocked position by pressing a first depressed area 402 of lever 400, which allows components of locking apparatus 40 to slide toward unlock direction 50. To position locking apparatus 40 in the locked position, a second depressed area 410 of lever 400 is pressed, which allows components of locking apparatus 40 to slide toward a lock direction 60. The lock and unlock operations of an exemplary embodiment of locking apparatus 40 will be more particularly described with references to FIGS. 2-5. It will be understood that although locking apparatus 40 is illustrated as being operated in certain directions to lock and unlock a drive 24, locking apparatus 40 may be located anywhere on device housing 30 and may be positioned in any suitable location within computer chassis 10 without limiting the scope of the invention. Additionally, although the terms first depressed area 402 and second depressed area 410 are used to describe portions of locking apparatus 40, in no way is the term "depressed area" used to import a limitation that those portions of locking apparatus 40 must have indentations, notches, grooves, dimples, or any other similar characteristic.

FIG. 2 is a top view of locking apparatus 40 described in FIG. 1. According to one embodiment, locking apparatus 40 comprises a lever 400 that is "L" shaped with a long portion 414 that has a width 406 and a length 408. Lever 400 may be of any other suitable shape without limitation. In one embodiment, the width 406 is in a range between approximately two and three inches and the length 408 is in a range between approximately 0.5 and one inch. In a particular embodiment, width 406 is 0.8 inches±0.01 inches, and length 408 is 2.8±0.01 inches. Any other suitable dimensions may be used depending on the configuration of device housing 30 and/or computer chassis 10.

Locking apparatus 40 is slidably coupled to device housing 30 such that when in the locked position, locking apparatus 40 secures a drive that is housed in device housing 30. According to one embodiment, locking apparatus 40 comprises at least one latch or flange (not shown) that fits in a side notch 34a of device housing 30 in order to position locking apparatus 40 in a locked position. Also, lever grips 404 couple lever 400 to a locking base that will be more particularly described with reference to FIGS. 3 and 4. In one embodiment, lever 400 is a plastic "L"-shaped lever that is positioned in an unlock position by pressing first depressed area 402 and by sliding the lever 400 in the unlock direction. Of course, in other embodiments lever 400 may be of any suitable material, such as metal. The sliding operation causes lever grips 404 to move the locking base attached to lever 400 in order to release at least one flange of locking apparatus 40 and therefore unlock the drive housed by device housing 30.

FIG. 3 is a cross-sectional view of the exemplary locking apparatus 40 of FIG. 2. Lever 400 is illustrated in a locked position, where second depressed area 410 of a second lever portion 412 includes a second lever protrusion 420 that couples lever 400 to device housing 30, such as by placing second lever protrusion 420 in a cavity on device housing 30. This coupling makes lever 400 more secure in the locked position by preventing second lever portion 412 from vertical movement. In one embodiment, second lever portion 412 is substantially perpendicular to long portion 414, thereby forming an "L"-shaped lever 400. Second lever portion 412 may have any dimension and shape suitable for positioning lever 400 in a locked position. For example, second lever portion 412 may be shorter or longer than long portion 414 without limitation. Additionally, second lever portion 412 may be eliminated such as, for example, when long portion 414 can be operated to lock and unlock locking apparatus 400. According to the illustrated embodiment, second depressed area 410 comprises ribs suitable for providing gripping surface.

Locking apparatus 400 includes a spring 430 that is coupled to lever 400 and base 450. As shown, lever 400 and base 450 are disposed at opposite sides of a surface 32 of device housing 30. In the illustrated embodiment, spring 430 is disposed between lever 400 and an outward surface of device housing 30, such that operation of spring 430 does not interfere with operation of base 450. Spring 430 is pivotally coupled to spring coupler 456 of device housing 30 and to spring axle 454 of base 450. Spring 430 provides pull tension when locking apparatus 40 is in the locked position. For example, lever 400 and base 450 slide to a locked position, which causes spring 430 to be pulled in the lock direction. This tension enables main flange 452 of base 450 to lodge into housing notch 34b thereby securing locking apparatus 40 on device housing 30 in a locked position. The tension of spring 430 is at least partially released when base 450 slides in an unlock direction. This unlock operation may be accomplished by pressing first depressed area 402 in a depression axis 70 such that first lever protrusion 424 pushes main flange 452 along axis 70 to dislodge main flange 452 from housing notch 34b. Base 450 is then free to move about a horizontal axis 60 (illustrated in FIG. 1), which is encouraged by the release of tension in spring 430, which then causes the uncoupling of second lever protrusion 420 from device housing 30.

In one embodiment, locking apparatus 40 is disposed in a raised housing portion 32. In that embodiment the components of locking apparatus 40 are dimensioned to fit within raised housing portion 32 so as to clear the surface 80 of the drive as shown in FIG. 3.

FIG. 4 is a bottom view of the exemplary locking apparatus 40 of FIG. 2. According to the illustrated embodiment, base 450 is an elongated stainless steel piece that is coupled to lever 400 and spring 430. Base 450 may comprise any suitable shape and be made of any other suitable material without limitation, and is disposed outwardly from a section of device housing 30. Lever 400 is also disposed outwardly from and opposite base 450 relative to device housing 30. For example, the portion of device housing 30 is disposed between base 450 and lever 400.

In one embodiment, base 450 comprises a spring axle 454, a main flange 452, and a side flange 426 arranged as shown in FIG. 4. Spring axle 454 is illustrated being pivotally coupled to spring 430. However, spring 430 may be coupled to spring axle 454 in any other suitable manner without limitation. Main flange 452 and side flange 426 are configured to lodge into housing notches 34b and 34a respectively. As was explained with reference to FIG. 3, base 450 slides with the locking motion of lever 400 such that main flange 452 may lodge into notch 34b. Base 450 allows for a locking mechanism using side flange 426 in a similar manner with respect to housing notches 34a. The spring 430 is pulled in the lock direction to provide a tension which main flange 452 and side flanges 426 utilize to lock device housing 30. In one embodiment, the alignment of the notches of locking lever 400 to device housing 30 also causes the locking of the drive 24, when drive 24 includes notches that align with the respective protrusions of locking lever 40 in the same fashion as notches in device housing 30.

An advantage of using locking apparatus 400 that is located inside computer chassis 10 is that the probability of theft of drive 24 is reduced. That is, the removal of a device housing 30 and therefore the drive housed therein necessitates removing the cover of computer chassis 10, operation of locking apparatus 40 and, in some embodiments, sliding lever 20 shown in FIG. 1. The added operations of accessing the interior of computer chassis 10 provides a deterrent factor that may be more efficient in preventing unwanted removal of a drive. Additionally, the operation of locking apparatus 40 does not require the use of special tools and uncomplicated to operate. Locking apparatus 40 may provide other advantages that may become apparent to one of ordinary skill in the art.

FIG. 5 is a method 500 of locking a computer device using an embodiment of locking apparatus. Method 500 begins at operational block 510 where a lever 400 is provided, where the lever comprises at least one flange. As was described with reference to FIG. 4, lever 400 is slidably positioned into a lock position and unlock position by acting on first depressed area 402 and second depressed area 410 respectively. At operational block 520, base 450 is slidably coupled to device housing 30. According to one embodiment, base 450 comprises at least one flange that slides into a corresponding housing notch 34. Base 450 may include any suitable number of flanges of any suitable shape without limitation. The coupling of base 450 to device housing 30 may comprise any fastener or attachment structure that is suitable for base 450 to slide in concert with lever 400 into a lock and unlock position.

At operational block 530, base 450 is attached to lever 400. As was described with reference to FIGS. 2 and 3, lever grips 404 couple to base 450 to allow for lever 400 to slide in concert with base 450. Locking apparatus 40 is operated by activating a spring 430 that is coupled to device housing 30 and lever 400, at operational block 540. With sliding lever 400 into a lock position, base 450 slides correspondingly and spring 430 provides resistance so that the at least one flange lodges into a corresponding housing notch. Although throughout this description, a lock and unlock position have been described, locking apparatus 40 may include more or fewer positions depending on the application. For example, locking apparatus 40 may be operated in only the locked position. As another example, locking apparatus 40 may have additional positions, such as an eject position at which components of locking apparatus 40 may be detached from locking apparatus 40. After sliding lever 400 into a lock position, method 500 terminates. Method 500 may be modified, such as by adding or removing steps without limitation. For example, after sliding lever 400 in a lock position, an additional operational block of sliding lever 400 in an unlock position may be added in the circumstances where device housing 30 is to be removed.

Although an embodiment of the invention and its advantages are described in detail, a person skilled in the art could make various alterations, additions, and omissions without departing from the spirit and scope of the present invention as defined by the appended claims. While an exemplary embodiment of locking apparatus 40 is described in detail in FIGS. 2-5, the scope of the present invention is not so limited. Rather, any implementation of a locking mechanism that is arranged in a computer chassis coupled to a device housing is intended to be encompassed by the present invention.

What is claimed is:

1. A lock for a computer device comprising:
   a lever operable to be positioned in a locked position;
   a locking base slidably coupled to a device housing and to the lever and comprising at least one flange; and
   a spring coupled to the locking base and to the device housing and operated upon by deflection of the lever in a direction perpendicular to a direction in which the base is configured to slide, where in the locked position the at least one flange slides in a first corresponding at least one notch formed on the device housing;
   wherein the lever further comprises an "L" shaped piece having a long portion and a second lever portion, where the long portion comprises a depressed area operable to cause positioning of the lever in an unlocked position.

2. The lock for the computer device of claim 1, wherein the second lever portion comprises a ribbed surface operable upon to cause the positioning of the lever in the locked position.

3. The lock for the computer device of claim 1, therein the long portion comprises a length in a range between two and three inches.

4. The lock for the computer device of claim 1, wherein the lever further comprises a width in a range between 0.5 and one inch.

5. The lock for the computer device of claim 1, wherein the locking base is made out of stainless steel.

6. The lock for the computer device of claim 1, wherein the lever is made out of plastic.

7. The lock for the computer device of claim 1 wherein the lever comprises two orthogonally arranged members, wherein one member comprises a protrusion that is configured to insert into a corresponding cavity in the device housing when in the locked position and is configured to be removed from the cavity when in an unlocked position.

8. The lock for the computer device of claim 1 wherein, when the lock is in an unlocked position, the spring causes the lock to remain in the unlocked position.

* * * * *

UNITED STATES PATENT AND TRADEMARK OFFICE
CERTIFICATE OF CORRECTION

| | | |
|---|---|---|
| PATENT NO. | : 8,434,832 B2 | Page 1 of 1 |
| APPLICATION NO. | : 11/077072 | |
| DATED | : May 7, 2013 | |
| INVENTOR(S) | : John E. Calloway et al. | |

It is certified that error appears in the above-identified patent and that said Letters Patent is hereby corrected as shown below:

In the Claims:

In column 6, line 17, in Claim 3, delete "therein" and insert -- wherein --, therefor.

Signed and Sealed this
Twenty-fourth Day of September, 2013

Teresa Stanek Rea
*Deputy Director of the United States Patent and Trademark Office*